United States Patent
Yu et al.

(10) Patent No.: US 7,031,305 B1
(45) Date of Patent: Apr. 18, 2006

(54) APPARATUS AND METHOD FOR PROGRAMMABLE MEMORY ACCESS SLOT ASSIGNMENT

(75) Inventors: Ching Yu, Santa Clara, CA (US); Xiaohua Zhuang, Santa Clara, CA (US); Bahadir Erimli, Campbell, CA (US); John M. Chiang, San Jose, CA (US); Shashank Merchant, Sunnyvale, CA (US); Robert Williams, Cupertino, CA (US); Edward Yang, San Jose, CA (US); Chandan Egbert, San Jose, CA (US); Vallath Nandakumar, Campbell, CA (US); Ian Lam, Daly City, CA (US); Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,156

(22) Filed: May 24, 1999

(51) Int. Cl.
  *H04L 12/28* (2006.01)

(52) U.S. Cl. .................. 370/389; 370/395.4; 370/412; 370/458; 370/468

(58) Field of Classification Search ............... 370/230, 370/232, 233, 234, 371, 378, 381, 389, 395.2, 370/395.21, 795.3, 395.31, 395.4, 395.42, 370/412, 462, 463, 468, 379, 382, 386, 429, 370/395.3, 458
See application file for complete search history.

(56) References Cited

U.S. PATENT DOCUMENTS

| | | | |
|---|---|---|---|
| 4,251,880 A * | 2/1981 | Baugh et al. ................. 370/80 |
| 5,056,086 A * | 10/1991 | Libonati ...................... 370/62 |
| 5,390,184 A * | 2/1995 | Morris ........................ 370/353 |
| 5,515,376 A | 5/1996 | Murthy et al. ........... 370/85.13 |
| 5,812,792 A | 9/1998 | Haddock et al. ........ 395/200.79 |
| 5,841,772 A * | 11/1998 | Daniel et al. ............... 370/395 |
| 5,889,779 A * | 3/1999 | Lincoln ...................... 370/398 |
| 6,005,866 A * | 12/1999 | Lincoln ...................... 370/398 |
| 6,212,197 B1* | 4/2001 | Christensen et al. ........ 370/463 |
| 6,246,680 B1* | 6/2001 | Muller et al. ............... 370/389 |
| 6,272,109 B1* | 8/2001 | Pei et al. .................... 370/230 |
| 6,438,106 B1* | 8/2002 | Pillar et al. ................. 370/232 |
| 6,442,137 B1* | 8/2002 | Yu et al. ..................... 370/232 |
| 6,597,693 B1* | 7/2003 | Leung ........................ 370/386 |

FOREIGN PATENT DOCUMENTS

| | | |
|---|---|---|
| EP | 0 876 075 A3 | 11/1998 |
| WO | WO 98/36534 | 8/1998 |

* cited by examiner

*Primary Examiner*—Dang Ton
*Assistant Examiner*—Shick Hom (57) ABSTRACT

A network switch having switch ports for full-duplex communication of data packets with respective network nodes according to Ethernet (IEEE 802.3) protocol that flexibly assigns memory access slots to access an external memory according to programmable information. A scheduler within an external memory interface assigns the memory access slots to the respective network switch ports according to a programmed sequence written into an assignment table memory from an external programmable data storage device.

16 Claims, 9 Drawing Sheets

APPARATUS AND METHOD FOR PROGRAMMABLE MEMORY ACCESS SLOT ASSIGNMENT

BACKGROUND OF THE INVENTION

1. Field of the Invention

The present invention relates to networks and more particularly, to a system and method of controlling network traffic data in a full-duplex switched network operating according to Ethernet (IEEE 802.3) protocol.

2. Background Art

Switched local area networks use a network switch for supplying data frames between network stations or other network nodes, where each network node is connected to the network switch by a media. The switched local area network architecture uses a media access control (MAC) enabling a network interface within each network node and the network switch to access the media. The network switch stores and forwards data frames received from a transmitter node to a destination node based on header information and the data in the received frames, including source and destination address. An external memory, such as an SSRAM, is used by the network switch to temporarily store the data frames as they are passed through the switch. In particular, the network switch stores and fetches data frames in the external memory via an external memory bus.

A difficulty in designing a network switch to be "non-blocking" (i.e., preventing delay in transferring a data packet received at an input switch port), yet with limited memory bandwidth resources, is ensuring that each port of the network switch has sufficient memory resources allocated from the external memory to prevent the delay of data transmission. The external memory bus of an SSRAM, for example, has a limited bandwidth based on the number of data bits on the external memory bus (e.g., 16-bit, 32-bit, etc.) and the data rate of the bus. Hence, a network switch may allocate a fixed number of time slots for each port of the network switch. However, the data traffic on higher speed switch ports may exceed the bandwidth capacity of the external memory bus.

Previous switches have been proposed which assign memory slots to ports using a request based arbitration scheme that grants memory slots to ports requesting slots on a "first come, first serve" basis. As the slots are requested, an arbitrator grants slots in answer to the requests as they are received, but only after previously requested slots have been completed. The request based arbitration scheme, however, is complex and difficult to implement, increasing the likelihood for errors. From an implementation standpoint, such arbitration schemes present more difficulty in controlling the memory allocation.

Other systems have included fixed slot schemes which assign a fixed amount of bandwidth to each slot of the network switch. However, these systems are expensive since sufficient bandwidth capacity must be provided to all of the slots at all times. In addition, since ports are not fully utilized at all times, much of the assigned bandwidth is wasted due to times of inactivity on a network switch port.

There is a need for a network switch that assigns memory access slots according to a programmable memory slot assignment scheme to avoid waste of bandwidth resources.

SUMMARY OF THE INVENTION

There is also a need for a network switch that assigns memory access slots according to a programmable slot assignment scheme, eliminating the need for a complex arbitration scheme.

These and other needs are attained by the present invention, where limited memory bandwidth slots are assigned to respective ports according to information stored in a programmable table.

According to one aspect of the invention, a network switch includes a plurality of ports configured for transferring data packets. An external memory interface within the network switch is configured for transferring data packets between the network switch and an external memory. The external memory interface includes a scheduler for selectively assigning memory access slots of the external memory interface to the ports based on respective programmable information entries. Selectively assigning memory access slots to the ports based on programmable information entries affords the present invention flexibility in assigning memory access slots based on programmable information. Furthermore, the network switch can be optimized for different network configurations based on respective sets of programmable information. Additionally, using programmable information entries eliminates the need for complex and costly request based arbitration schemes since the assignment of memory access slots is based on programmable information.

According to another aspect of the invention, a method assigns memory access slots in a network switch to a plurality of network switch ports, each configured for transferring data packets to an external memory. The method includes first storing programmed memory access slot assignment information into a memory. The network switch then selectively assigns memory access slots to the respective network switch ports based on the programmed memory access slot assignment information. Selectively assigning memory access slots to respective ports based on programmed memory access slot assignment information affords the present invention flexibility in assigning slots based on information which is changeable through programming. In addition, the use of programmed memory access slot assignment information eliminates the need for complex and costly request based arbitration schemes.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 comprised of FIGS. 3A–C is a block diagram illustrating in detail the switching subsystem of FIG. 2.

DETAILED DESCRIPTION OF ILLUSTRATIVE EMBODIMENTS

Figure 1:
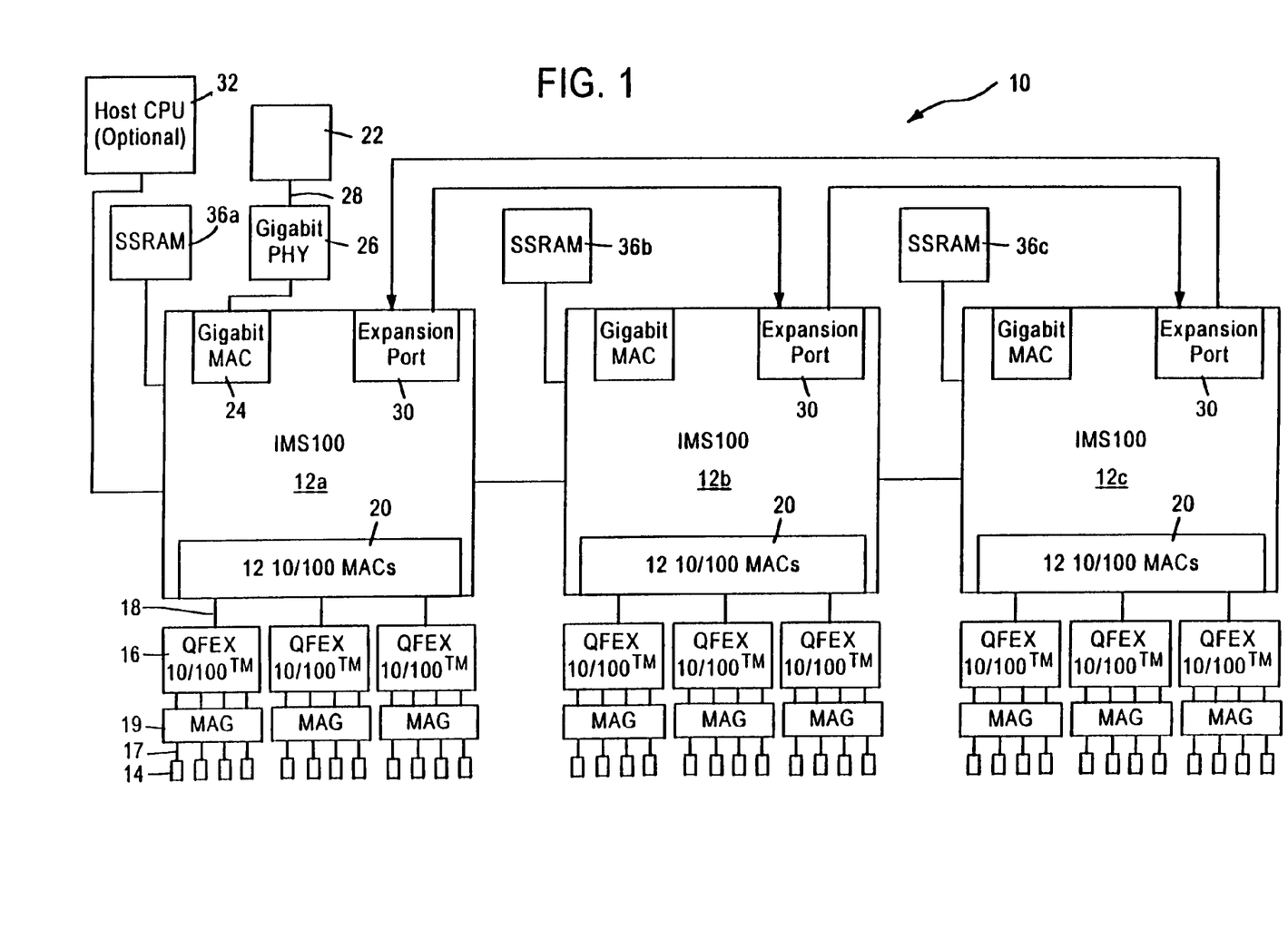
FIG. 1 is a block diagram of a packet switched network including a multiple port switch according to an embodiment of the present invention.

The present invention will be described with the example of a switch in a packet switched network, such as an Ethernet (IEEE 802.3) network. It will become apparent, however, that the present invention is also applicable to other packet switched systems, Switch Architecture Overview FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
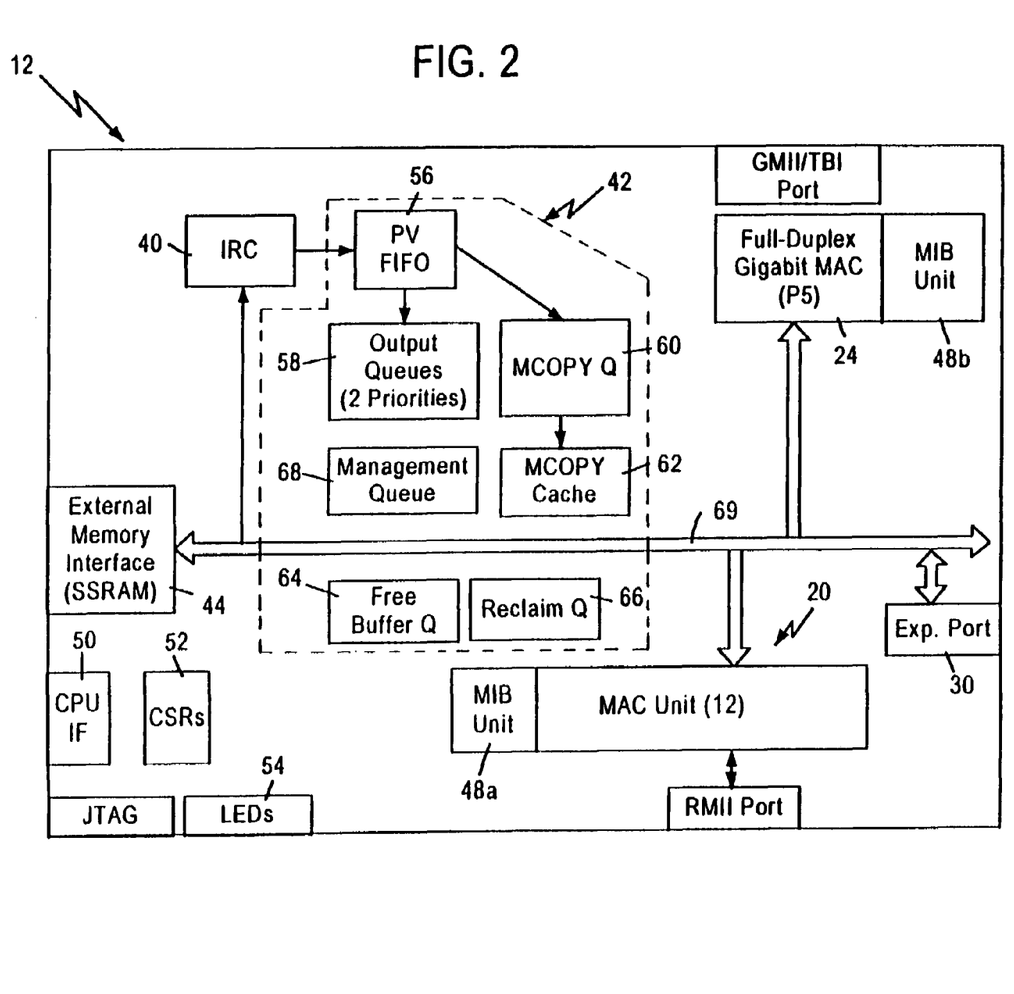
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SS-RAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
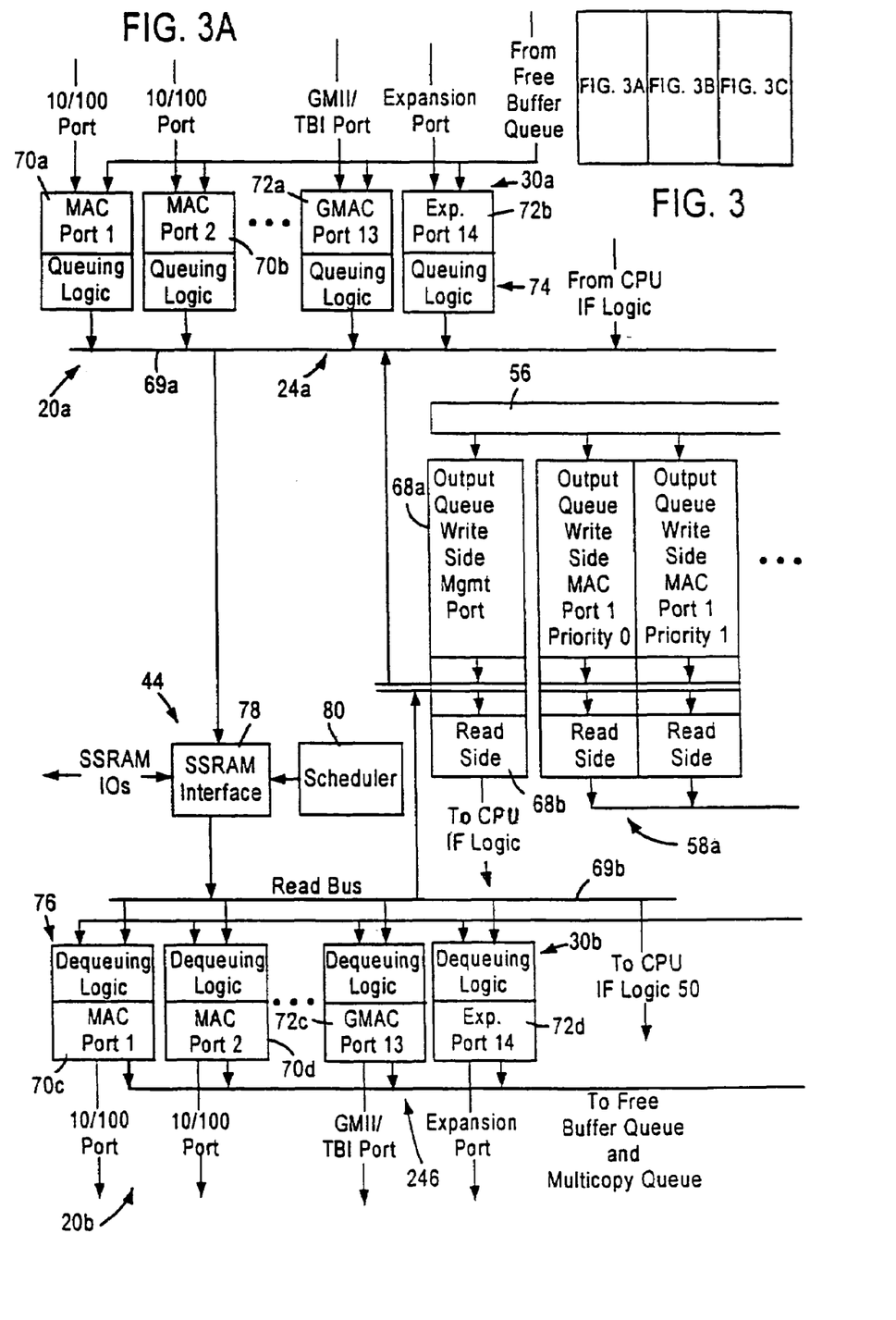
Figure 3B:
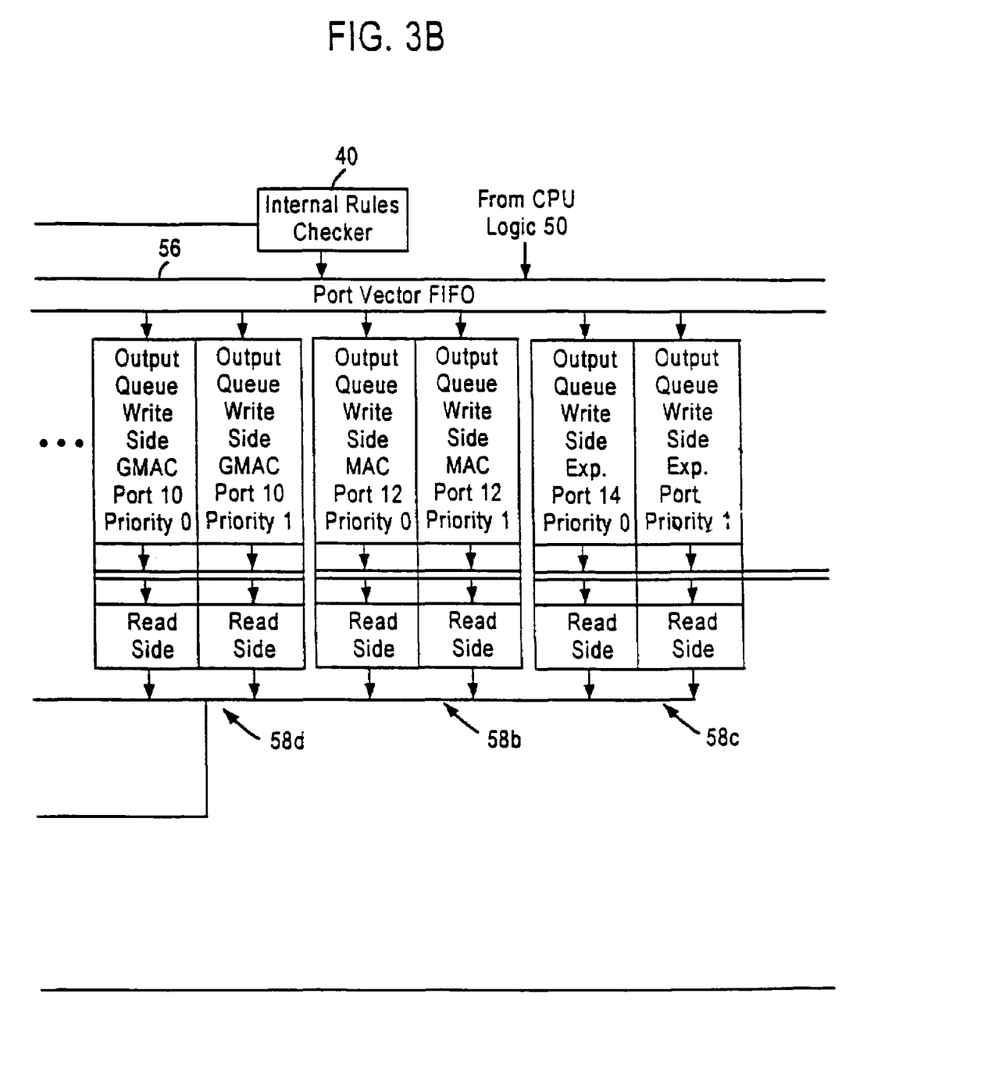
Figure 3C:
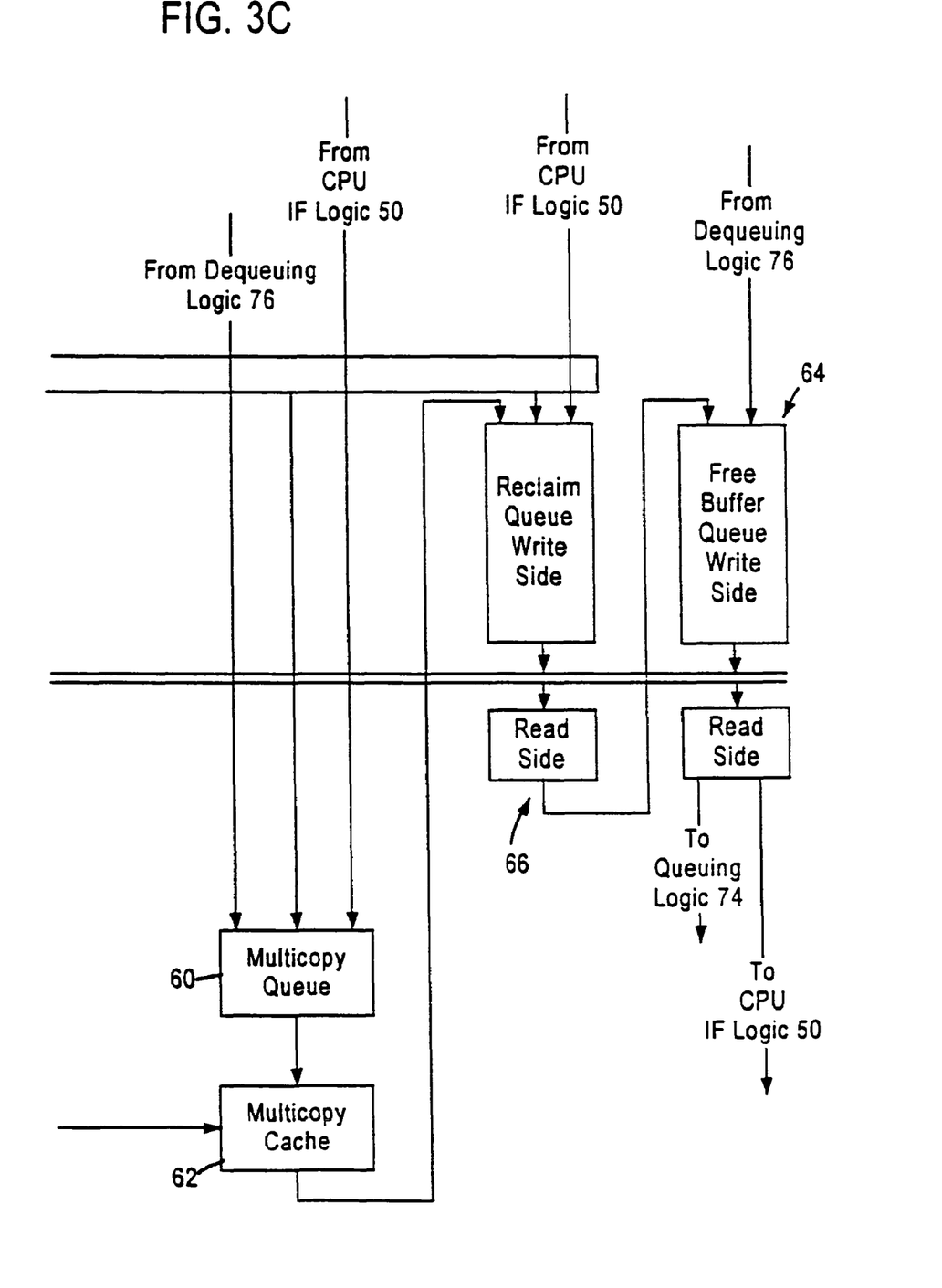

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44.

The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame. As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the network switch 12 will now be provided.

Programmable Memory Access Slot Assignment

In an embodiment of the present invention, the scheduler 80 as part of the external memory interface 44, is used for scheduling and issuing grants of bandwidth to network switch ports for access to the SSRAM 36. In this particular embodiment, the SSRAM 36 preferably has a 64-bit wide data path with a 100 Mb/s clock equaling a maximum 6.4

Gigabit throughput (minus a few cycles for read-write turnaround). The present implementation of 12–100 Mb/s full-duplex ports plus a full-duplex Gigabit port 24 and an approximately 1.2 Gb/s Expansion port 30 exceeds the bandwidth capacity for accesses to the SSRAM 36. Hence, the present embodiment serves to assign portions of the bandwidth, referred to as memory access slots, to the network switch ports according to programmed information stored in an external memory device, such as an EEPROM or a controller, external to the network switch and written into an assignment table memory to be used by the scheduler 80 in assigning memory access slots.

Figure 4:
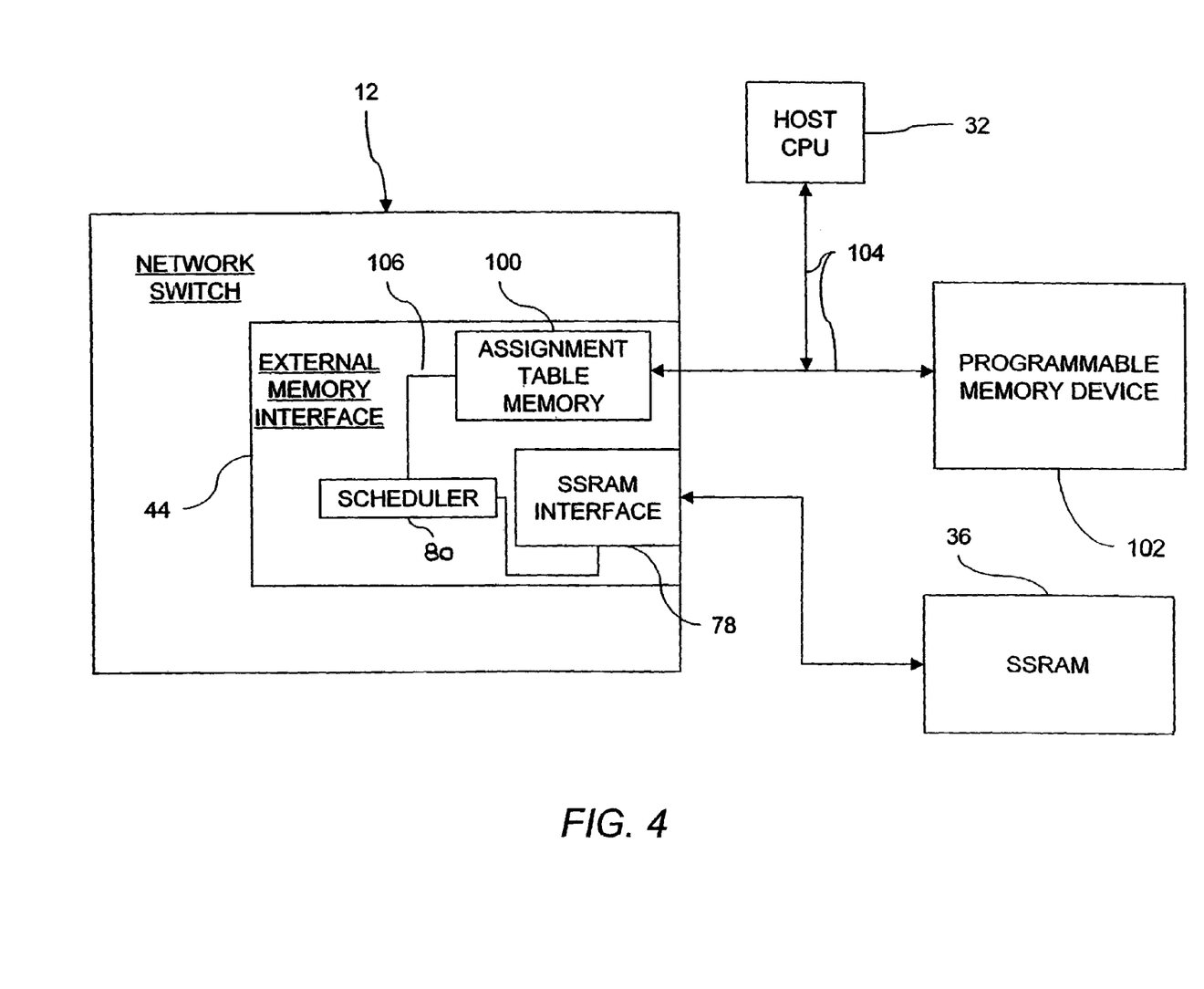
FIG. 4 is a block diagram illustrating in detail the external memory interface and network switch external connections according to an embodiment of the present invention.

As shown in FIG. 4, the network switch 12 includes an assignment table memory 100 within the external memory interface 44. The assignment table memory 100 stores an assignment table comprised of a number of programmable information entries. The assignment table is used by the scheduler 80 to assign memory access slots to the ports of the network switch 12. Each programmable information entry in the assignment table contains an assignment correlating a memory access slot to either an identified port or a group of ports from which one port is selected (i.e., a slot-to-port assignment). The assignment table memory 100 may be implemented using, for example, a RAM or a group of registers.

Initially, the host CPU 32 stores the information entries comprising an assignment table into an external programmable storage device 102, for example, over a bus 104 such as a Peripheral Component Interconnect (PCI) bus. The external programmable memory device 102 stores the programmed information entries to be later selectively written by the host CPU 32 to the assignment table memory 100. The programmable storage device 102 may be implemented by an EEPROM or any other device capable of receiving and storing programmed information.

Figure 5:
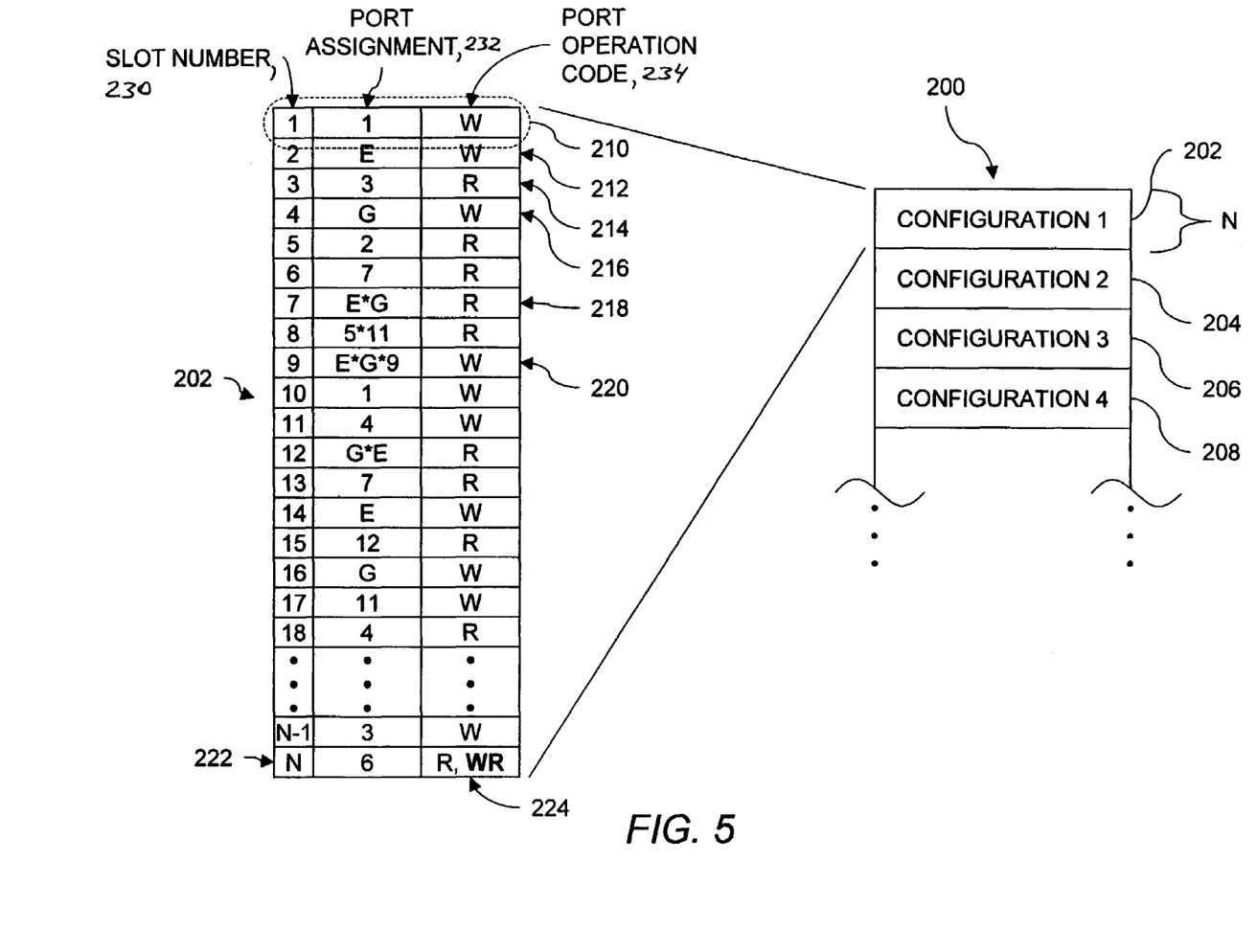
FIG. 5 is a diagram illustrating the programmable storage device and the tabular configuration of data stored in the device according to an embodiment of the present invention.

The programmable memory device 102 may also store a plurality of differently configured slot-to-port assignment tables to be used by the network switch. For example, each assignment table may correspond to a different network configuration for the switch 12. As shown in FIG. 5, for example, the storage area 200 of the programmable memory device 102 contains a plurality of differently configured assignment tables (e.g., 202, 204, 206, 208), each table having an "N" number of slot-to-port assignment entries. The number "N" represents the total number of slots in a scheduling sequence cycle, described below.

As an example, the first configuration 202 is enlarged in FIG. 5 to illustrate that each programmable information entry (e.g., 210) of the "N" number of memory access slots in the table includes a slot number 230, a port assignment 232, and a port operation code 234. Thus, as shown in FIG. 5, the number "1" is stored as the slot number 230 for entry 210 and the port assignment 232 for entry 210, indicating slot one is assigned to port number 1. The second entry 212 assigns slot number 2 to the Expansion port (i.e., "E"), the third entry 214 assigns slot number 3 to port number 3, the fourth entry 216 assigns slot number 4 to the Gigabit port (i.e., "G"), and so on. Additionally, a port operation code 234 such as a read ("R") or write ("W") bit is stored in each entry of the configuration table 202 to direct the scheduler 80 to assign a read or write slot, respectively, to a particular port. In other words, the port operation code 234 specifies whether the port is in a read or write operation.

FIG. 5 also illustrates the port assignment 232 for a given slot may specify a port based on a detected condition. For example, entry 218 for slot number 7 in configuration 202 may be assigned to either the Expansion port 30 ("E") or the Gigabit port 24 ("G"), the "OR" condition indicated an asterisk (*). A condition, such as whether the Expansion port 30 requests a slot within a prescribed period of time, could be used to determine whether the scheduler 80 assigns the slot to the Expansion port 30 or the Gigabit port 24. As a further example, the entry 220 for slot 9 in configuration 202 illustrates that a slot may be alternatively allocated to one of three (or more) ports given multiple alternative conditions. As an illustration of this example, a condition, such as which of the Expansion port 30 and the Gigabit port 24 first request the slot 9 within a first period of time, could be used to determine among these two ports which will receive the slot. Further, if neither the Gigabit port 24 nor the Expansion port 30 request the slot within the predetermined period, slot 9 would then be assigned to port 9.

One of the configuration tables (e.g., 202) stored in the programmable storage device 102 is selected and written into the assignment table memory 100 located within the external memory interface 44 by the Host CPU 32. In an exemplary embodiment, the host CPU 32 writes a selected assignment table into the assignment table memory 100 via the PCI bus 104. After the configuration table is written into the assignment table memory 100, the scheduler 80 then accesses this information via internal bus 106 and assigns the memory access slots to the ports based on the accessed information.

Figure 6:
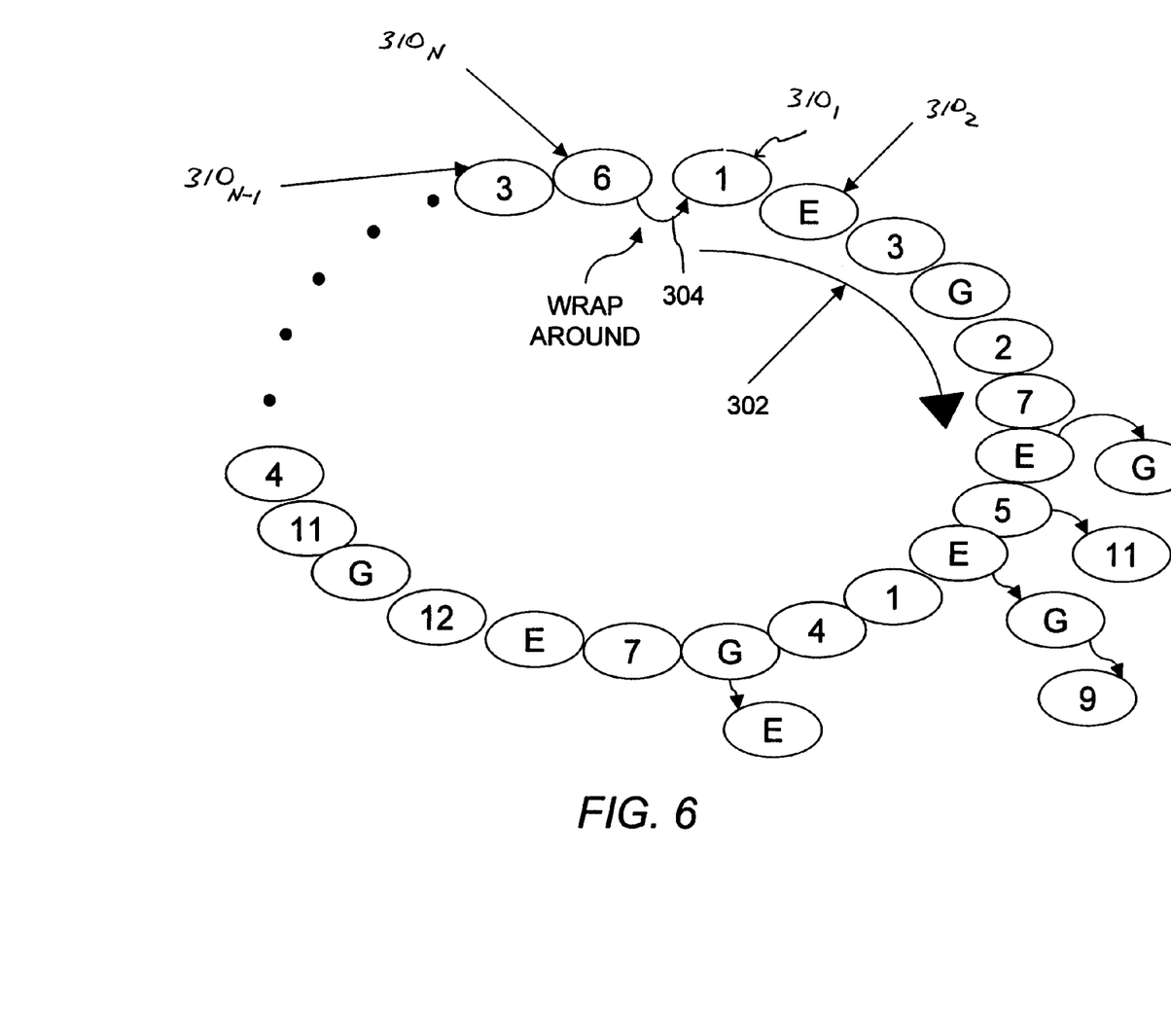
FIG. 6 is a sequence diagram illustrating memory access slot assignment according to an embodiment of the present invention.

FIG. 6 exemplifies the scheduling sequence cycle of assignment table 202 where the scheduler 80 assigns memory access slots 310 in response to decoding the entries of the configuration 202 stored in the assignment table memory 100. Each slot 310 specifies the port to which to the particular slot is assigned. As indicated by arrow 302, the sequence proceeds clockwise from slot to slot.

Additionally, a wrap-around bit ("WR") is stored in the last or "Nth" table entry of each of the configuration tables (e.g., 202, 204, 206, 208) to set the scheduling sequence cycle length. The scheduler 80 will return to the first slot $310_1$ in a sequence in response to detecting this wrap-around bit. For example, the configuration table entry 222 for slot N contains a wrap-around bit (WR) in the operation code entry 224 as shown in FIG. 5. FIG. 6 illustrates by arrow 304 that the scheduler 80 returns to slot $3101$ from slot $310_N$ to repeat the sequence in response to the presence of the wrap-around bit (WR) stored in the configuration table entry 222. Hence, the wrap-around bit sets the "N" number of slots per cycle to a prescribed number and affords flexibility in the scheduling sequence cycle length.

Figure 7:
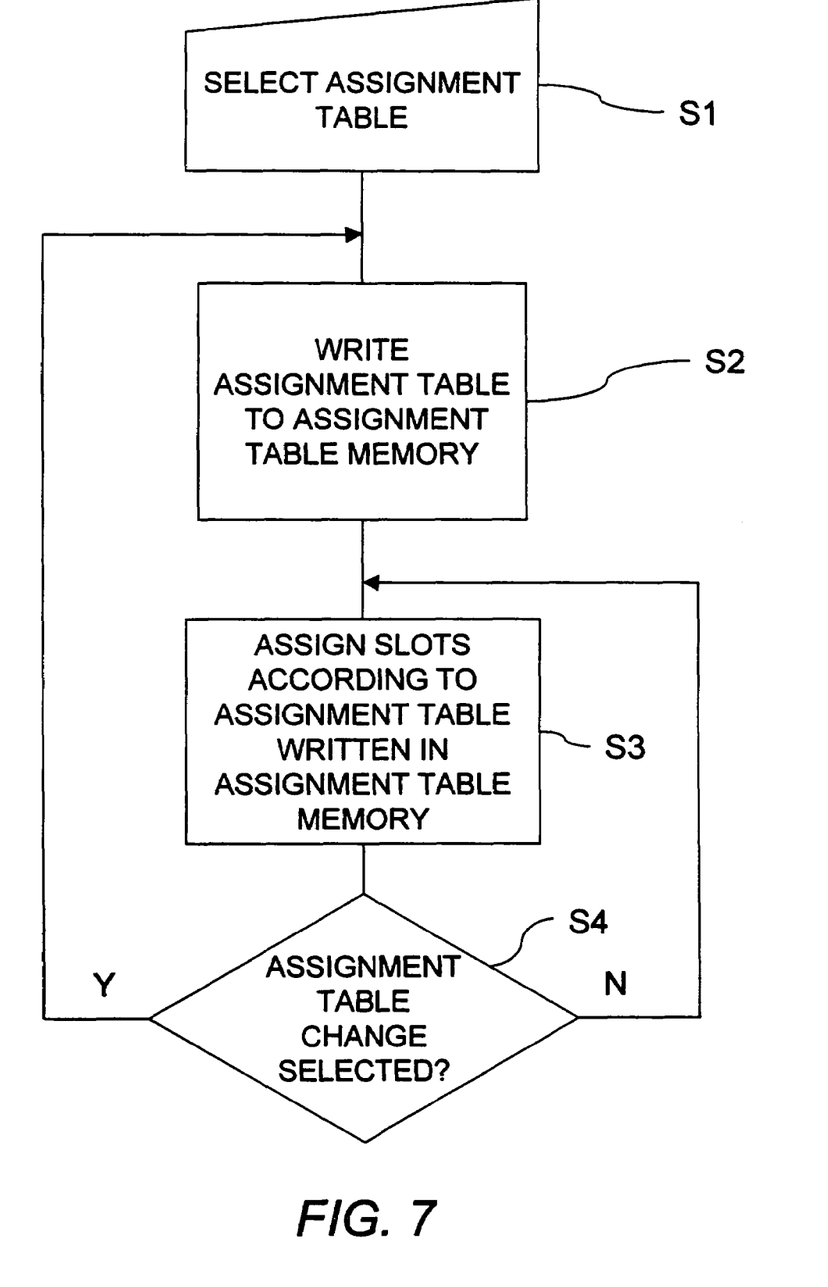
FIG. 7 is a flow diagram according to a method of the present invention.

FIG. 7 shows the method of present invention for assigning slots. In step S1, an assignment table is selected by the host CPU 32 from a plurality of programmed assignment tables stored in the programmable storage device 102 or, alternatively, the CPU programs and selects an assignment table directly from user input. At step S2, the host CPU 32 writes the selected assignment table (e.g., 202) from the programmable storage device 102 to the assignment table memory 100 of the external memory interface 44 or writes the user programmed assignment table directly to the assignment table memory 100. The scheduler 80 then decodes the port to slot assignment information stored in the assignment table memory 100 and, in response, assigns memory access slots to the network switch ports at step S3. The scheduler 80 then detects whether the host CPU 32 is attempting to initiate writing of a modified or new configuration table from the programmed storage device 102 to the assignment table memory 100 in step S4. If no changes to the assignment table memory 100 are being written, then the scheduler 80 continues to assign slots according to the existing assignment table stored in the assignment table memory 100. However, if changes are being attempted to be written to the assignment table memory, the method then loops back to step S2 where the assignment table memory changes are allowed by the scheduler 80 to be written to the assignment table memory 100 and the slots are then assigned according to the new sequence in step S3.

With respect to changing the information in the assignment table memory 100, a user may control operation of the network switch 12 via the host CPU 32 either by selecting an assignment table stored within the programmable memory device 102 or by programming a new assignment table into the assignment table memory 100 directly from the host CPU 32. As discussed previously, an alternative embodiment may include the programmable memory device 102 implemented as a controller, eliminating the need for control from the host CPU 32. Another embodiment may include writing address pointers into the internal registers of the network switch 12 that enable the scheduler 80 to directly fetch an assignment table from the programmable memory device 102 over the PCI bus 104.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the amended claims.

The invention claimed is:

1. A network switch comprising:
 a plurality of ports configured for transferring data packets; and
 an external memory interface configured for transferring the data packets between the network switch and an external memory, the external memory interface including a scheduler for selectively assigning memory access slots to ports for access to the external memory, wherein
 selectively assigning memory access slots by the scheduler is based on respective programmable information entries,
 the external memory interface includes an assignment table memory for storing the respective programmable information entries,
 the programmable information entries are stored in the assignment table memory by an external controller,
 each programmable information entry includes a port operation code, and the scheduler sets the operation of each of the ports based on the port operation code, and
 the port operation code includes one of a read bit and a write bit and the scheduler selectively assigns each of the memory access slots as one of a read slot and a write slot, based on the corresponding port operation code.

2. A network switch comprising:
 a plurality of ports configured for transferring data packets; and
 an external memory interface configured for transferring the data packets between the network switch and an external memory, the external memory interface including a scheduler for selectively assigning memory access slots to ports for access to the external memory, wherein
 selectively assigning memory access slots by the scheduler is based on a selected one of a plurality of programmable information entries,
 the external memory interface includes an assignment table memory for storing the programmable information entries,
 the selected one of the plurality of programmable information entries is stored in the assignment table memory by an external controller,
 the programmable information entries include a sequence of memory access slot assignments and a port operation code, the scheduler assigns the memory access slots as a continuously repeating sequence based on the sequence of memory access slot assignments, and
 the port operation code includes one of a read bit and a write bit and the scheduler selective assigns each of the memory access slots as one of a read slot and a write slot, based on the corresponding port operation code.

3. A network switch comprising:
 a plurality of ports configured for transferring data packets; and
 an external memory interface configured for transferring the data packets between the network switch and an external memory, the external memory interface including a scheduler for selectively assigning memory access slots to ports for access to the external memory, wherein
 selectively assigning memory access slots by the scheduler is based on respective programmable information entries,
 the external memory interface includes an assignment table memory for storing the respective programmable information entries,
 the programmable information entries are stored in the assignment table memory by an external controller,
 the programmable information entries include a sequence of memory access slot assignments and a port operation code, the scheduler assigns the memory access slots as a continuously repeating sequence based on the sequence of memory access slot assignments,
 the port operation code includes one of a read bit and a write bit and the scheduler selective assigns each of the memory access slots as one of a read slot and a write slot, based on the corresponding port operation code, and
 one of the programmable information entries includes a wrap-around bit at an end of the sequence of memory access slot assignments, the scheduler returns to a first memory access slot of the sequence of memory access slot assignments upon detecting the wrap-around bit.

4. The network switch according to claim 1, wherein the assignment table memory is a RAM.

5. The network switch according to claim 1, wherein the assignment table memory is a group of registers.

6. The network switch according to claim 1, wherein each programmable information entry includes a plurality of memory access slot assignments, the scheduler selecting one of the plurality of memory access slot assignments based on one or more detected conditions.

7. A method of assigning memory access slots in a network switch to a plurality of network switch ports, each configured for transferring data packets to an external memory, the method comprising:
 storing programmed memory access slot assignment information into a memory;
 selectively assigning memory access slots to the respective network switch ports based on the programmed memory access slot assignment information;

selecting a slot-to-port assignment configuration from the programmed memory access slot assignment information; and writing the selected slot-to-port assignment configuration from the memory to an assignment configuration memory within the network switch, the selectively assigning step including assigning the memory access slots to the respective network switch ports based on the selected slot-to-port assignment configuration stored in the assignment configuration memory, wherein the storing step comprises setting each slot-to-port assignment within the slot-to-port assign configuration to include one of a read and a write bit for indicating whether a corresponding memory access slot is one of a read and write slot.

8. A method of assigning memory access slots in a network switch to a plurality of network switch ports, each configured for transferring data packets to an external memory, the method comprising:

storing programmed memory access slot assignment information and port operation codes into a memory, each port operation code includes one of a read bit and a write bit for setting the operation of each port;

selectively assigning memory access slots to the respective network switch ports based on the programmed memory access slot assignment information and assigning each of the memory access slots as one of a read slot and a write slot, based on the corresponding port operation code;

selecting a slot-to-port assignment configuration from the programmed memory access slot assignment information; and writing the selected slot-to-port assignment configuration from the memory to an assignment configuration memory within the network switch, the selectively assigning step including assigning the memory access slots to the respective network switch ports based on the selected slot-to-port assignment configuration stored in the assignment configuration memory, wherein the storing step comprises setting the slot-to-port assignment configuration as a repeating sequence of an N number of memory access slot assignments.

9. A method of assigning memory access slots in a network switch to a plurality of network switch ports, each configured for transferring data packets to an external memory, the method comprising:

storing programmed memory access slot assignment information and port operation codes into a memory, each port operation code includes one of a read bit and a write bit for setting the operation of each port;

selectively assigning memory access slots to the respective network switch ports based on the programmed memory access slot assignment information and assigning each of the memory access slots as one of a read slot and a write slot based on the corresponding port operation code;

selecting a slot-to-port assignment configuration from the programmed memory access slot assignment information; and writing the selected slot-to-port assignment configuration from the memory to an assignment configuration memory within the network switch, the selectively assigning step including assigning the memory access slots to the respective network switch ports based on the selected slot-to-port assignment configuration stored in the assignment configuration memory, wherein the storing step includes storing into the slot-to-port assignment configuration a wrap-around bit that returns the sequence of an N number of memory access slot assignments to a first memory access slot at a start of the sequence of an N number of memory access slot assignments from an "Nth" memory access slot.

10. A switched network system comprising:

a first memory for storing a plurality of programmable system settings;

a second memory for storing data packets;

a network switch having a plurality of ports configured for transferring the data packets, the network switch including:

(1) an external memory interface configured for transferring data packets between the network switch and the second memory, and (2) a scheduler for selectively assigning memory access slots to each of the ports for access to the second memory, the selectively assigning memory access slots to each of the ports being based on a selected one of the plurality of programmable system settings stored in the first memory; and a system controller for supplying the selected one of the plurality of programmable system settings to the network switch, wherein the plurality of programmable system settings include a port operation code, for setting the operation of each port the port operation code includes one of a read bit and a write bit and the scheduler assigns the memory access slots as read and write slots, respectively.

11. The switched network system according to claim 10, wherein the external memory interface includes a memory access slot assignment table memory.

12. A switched network system comprising:

a first memory for storing a plurality of programmable system settings;

a second memory for storing data packets;

a network switch having a plurality of ports configured for transferring the data packets, the network switch including:

(1) an external memory interface configured for transferring data packets between the network switch and the second memory, and (2) a scheduler for selectively assigning memory access slots to each of the ports for access to the second memory, the selectively assigning memory access slots to each of the ports being based on a selected one of the plurality of programmable system settings stored in the first memory; and a system controller for supplying the selected one of the plurality of programmable system settings to the network switch, wherein the plurality of programmable system settings include a sequence of an N number of memory access slot assignments that is continuously repeated by the scheduler in assigning the memory access slots and port operation codes for setting the operation of each port, each port operation code includes one of a read bit and a write bit and the scheduler assigns each of the memory access slots as a read slot and a write slot, respectively.

13. A switched network system comprising:

a first memory for storing a plurality of programmable system settings;

a second memory for storing data packets;

a network switch having a plurality of ports configured for transferring the data packets, the network switch including:

(1) an external memory interface configured for transferring data packets between the network switch and the second memory; and (2) a scheduler for selectively assigning memory access slots to each of the ports for access to the second memory, the selectively assigning memory access slots to each of the ports being based on a selected one of the plurality of programmable system settings stored in the first memory; and a system controller for supplying the selected one of the plurality of programmable system settings to the network switch, wherein the plurality of programmable system settings include a sequence of an N number of memory access slot assignments that is continuously repeated by the scheduler in assigning the memory access slots, the plurality of programmable system settings include a sequence of an N number of memory access slot assignments that is continuously repeated by the scheduler in assigning the memory access slots and port operation codes for setting the operation of each port, each port operation code includes one of a read bit and a write bit and the scheduler assigns each of the memory access slots as a read slot and a write slot, respectively, and the plurality of programmable system settings include a wrap-around bit at an end of the sequence and the scheduler returns to a first memory access slot at a start of the sequence upon detecting the wrap-around bit.

14. The switched network system according to claim 10, wherein the memory access slot assignment table memory is a RAM.

15. The switched network system according to claim 10, wherein the memory access slot assignment table memory is a group of registers.

16. The switched network system according to claim 11, wherein the first memory is an EEPROM.

* * * * *